United States Patent
Suemitsu

(10) Patent No.: US 10,263,717 B1
(45) Date of Patent: Apr. 16, 2019

(54) METHOD OF SYNCHRONIZING PAUSE PROCESS AND SYSTEM OF SYNCHRONIZING PAUSE PROCESS

(71) Applicant: Yamaha Corporation, Shizuoka-ken (JP)

(72) Inventor: Yuki Suemitsu, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

(21) Appl. No.: 15/862,588

(22) Filed: Jan. 4, 2018

(51) Int. Cl.
*H04H 20/18* (2008.01)
*H04L 7/02* (2006.01)
*H04W 56/00* (2009.01)

(52) U.S. Cl.
CPC ............ *H04H 20/18* (2013.01); *H04L 7/02* (2013.01); *H04W 56/0015* (2013.01); *H04H 2201/20* (2013.01)

(58) Field of Classification Search
CPC .......... H04H 20/18; H04R 3/12; H04R 27/00; H04R 2227/005; H04R 2227/003; H04W 56/0065; H04L 69/28; H04L 65/60; H04L 64/4076; G06F 3/165

USPC ............... 700/94; 381/85, 71.11, 74
See application file for complete search history.

(56) References Cited

U.S. PATENT DOCUMENTS 9,658,820 B2 * 5/2017 Millington ............ H04J 3/0664
2017/0347331 A1 * 11/2017 Daley .................... H04H 20/08

FOREIGN PATENT DOCUMENTS

JP        2016-526826 A    9/2016

* cited by examiner

*Primary Examiner* — Melur Ramakrishnaiah
(74) *Attorney, Agent, or Firm* — HEA Law PLLC

(57) ABSTRACT

A method for synchronizing a pause process during playback compress: delivering a pause release instruction, and a first period for which a first audio device is paused, simultaneously, the steps being performed by the first audio device. The method also comprises (i) receiving the pause release instruction, and the first period, and (ii) adjusting a playback of the audio data based on a difference between the first period and a second period for which a second audio device is paused, the steps being performed by the second audio device.

18 Claims, 9 Drawing Sheets

| Play Timestamp (Ts) | | Time Offset (To) : T1 |
|---|---|---|
| Pause Flag (Fp) | Gain Offset (Og) | Audio Data (Da) |
| Audio Data (Da) | | |

FIG.6

METHOD OF SYNCHRONIZING PAUSE PROCESS AND SYSTEM OF SYNCHRONIZING PAUSE PROCESS

TECHNICAL FIELD

The present disclosure relates to a method of synchronizing a playback of audio data between two or more devices, and a system for synchronization of the playback of the audio data between two or more devices.

BACKGROUND

When audio data is distributed from a server to a client device through a communication network, steps to synchronize the playback of the audio data between the server and the client device have been developed. Further, the synchronization is required between the server and the client device during a pause process. In the pause process, the synchronization of both, at a time of initiating the pause process, and at a time of releasing the pause process (i.e., a resumption of the playback after the pause prose ends), is required between the server and the client device.

Some related art discloses measures to synchronize the audio data between two devices. For example, Japanese Patent Application Publication No. 2016-526826 discloses that when a latency exists between two stations, one of the stations performs a pause or jump operation for a period corresponds to the latency, thereby achieving a synchronization between two stations. However, this reference does not disclose how to achieve the synchronization at the time of the resumption of the playback (i.e., at the time of the release of the pause).

SUMMARY

In view of the above circumstances, an object of the present disclosure is to provide a method and a system which solve the problem related to the network in distributing audio data from one device to another device. An object of an embodiment of the present disclosure is to provide a method to synchronize the playback of the audio data between two devices when the pause is released (i.e., when the playback of the audio date is resumed) even if the packet delivery time is different between when the pause starting instruction is delivered and when the pause release instruction is delivered. Another object of an embodiment of the present disclosure is to provide a system that synchronizes the playback of the audio data between two devices when the pause is released (i.e., when the playback of the audio date is resumed) even if the packet delivery time is different between when the pause starting instruction is delivered and when the pause release instruction is delivered. Another object of an embodiment of the present disclosure is to provide a method which prevents the overflow of the buffer at the audio device which receives the audio data.

To achieve these objects, one aspect of the disclosure relates to a method for synchronizing a pause process during playback of audio data, where the method comprises the following steps: delivering i) a pause release instruction, and ii) a first period for which a first audio device is paused, the pause release instruction and the first period for which the first audio device is paused being delivered simultaneously, the steps being performed by a first processor of the first audio device; and receiving the pause release instruction, and the first period for which the first audio device paused, and adjusting the playback of the audio data based on a difference between the first period and a second period for which a second audio device is paused, the steps being performed by a second processor of the second audio device, which is different from the first audio device.

One aspect of the disclosure relates to a system for synchronizing a pause process during playback of audio data, where the system comprises: (i) a first audio device that includes: a first memory that stores a first program, and a first processor that is configured to execute the first program stored in the first memory to deliver: i) a pause release instruction, and ii) a first period for which the first audio device paused, the pause release instruction and the first period for which the first audio device paused being delivered simultaneously; and (ii) a second audio device which is different from the first audio device and includes: a second memory that stores a second program, and a second processor that is configured to execute the second program stored in the second memory to: receive i) the pause release instruction, and ii) the first period for which the first audio device is paused, calculate a difference between the first period for which the first audio device is paused and a second period for which the second audio device paused, and adjusts the playback of the audio data based on the difference between the first period and the second period.

One aspect of the disclosure relates to a method for releasing a pause process during playback of audio data, where the method comprises the following steps: (i) receiving a pause release instruction and first audio data, the pause release instruction and the first audio data being delivered simultaneously, the step being performed by a first processor of a first audio device; and (ii) releasing the pause process in response to the receipt of the pause release instruction, the step being performed by the first processor of the first audio device.

Other objects and aspects of the disclosure will be understood by the detailed description of the invention.

BRIEF DESCRIPTION OF THE DRAWINGS

FIG. 6 shows an example of a packet data structure.

DETAILED DESCRIPTION OF THE INVENTION

Overview

Figure 1:
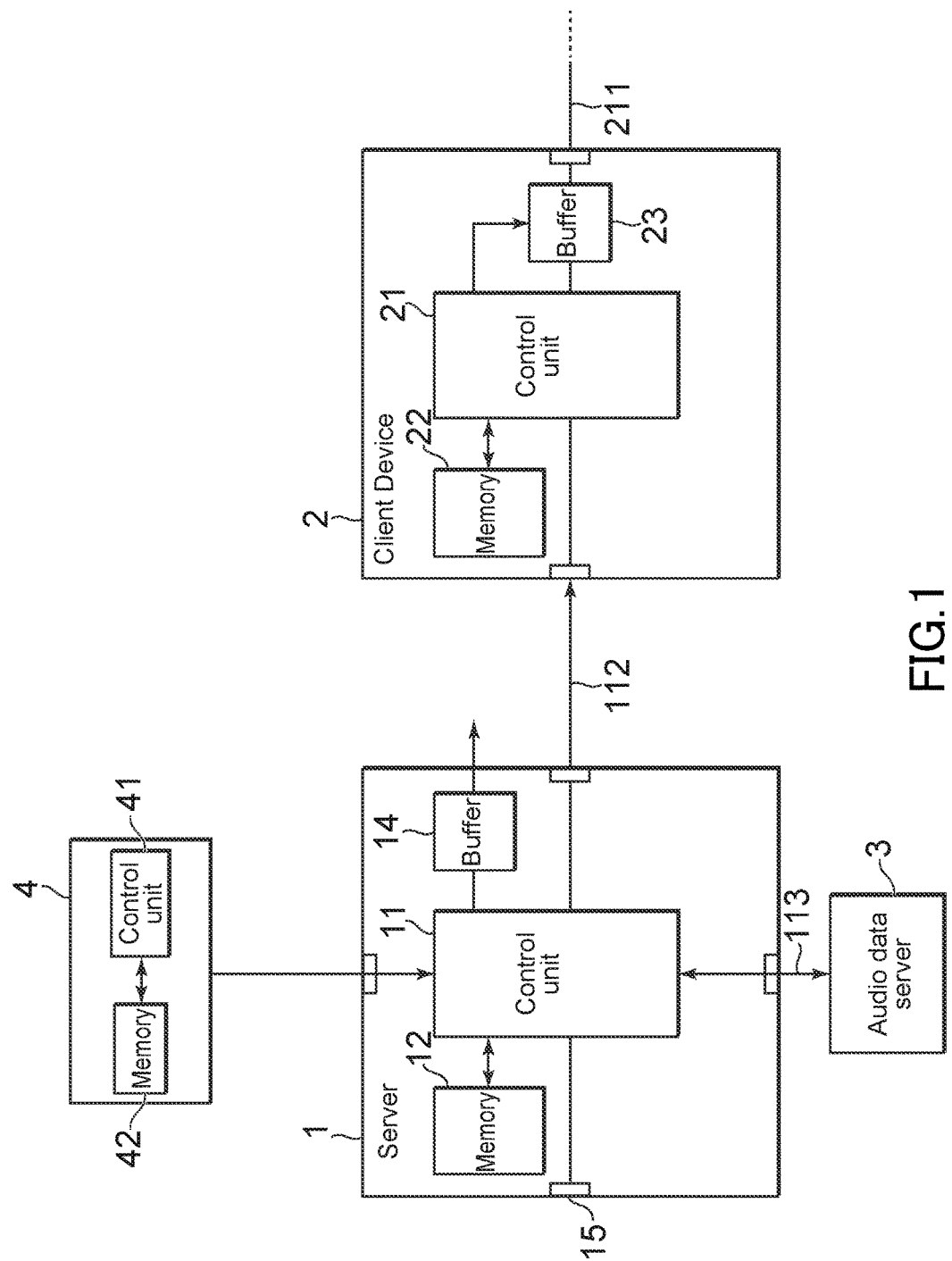
FIG. 1 shows an overall configuration of one embodiment.

FIG. 11 shows an overall configuration of one embodiment. A server 1 includes one or more control unit 11 (e.g., CPU: Central Processing Unit, a processor, a microcomputer, or circuits, etc.) and a memory 12 such as ROM, RAM and others. The memory 12 stores programs and related data, and the control unit 11 performs the functions of the server 1 by executing the program stored in the memory 12. The server 1 also includes a buffer 14 that stores audio data which is used for the playback. A client device 2 includes one or more control unit 21 (e.g., CPU: Central Processing Unit, a processor, a microcomputer, or circuits, etc.) and a memory 22 such as ROM, RAM. The memory 22 stores programs and related data, and the control unit 21 performs the functions of the server 1 by executing the program stored in the memory 22. The client device 2 also includes a buffer 23 that stores the audio data, which is used for the playback. An audio data server 3 stores the audio data.

A remote controller 4 such as a computer system, a portable computing device, a cellular phone, a smartphone etc., includes a control unit 41 such as a CPU or a processor, or a microcomputer, and a memory 42 such as a ROM and RAM and others. The memory 42 stores an application and when the application is executed by the control unit 41, the application enables the remote controller 4 to wirelessly communicate with the server 1, and provide instructions to the server 1, such as starting the pause process and releasing the pause process. The remote controller 4 may be connected to the server 1 through a wired communication.

In the above system, a user may use the remote controller 4 to provide the instructions to the server 1 such as initiating the playback, initiating the pause process and releasing the pause process. For example, once the server 1 receives the instructions to initiate the playback of the audio data from the remote controller 4, the server 1 initiates the playback of the audio data which is already saved in the buffer 14. The server 1 requests and receives the audio data from the audio data server 3 through a communication network 113 (either a wireless network or a wired network). The server 1 transmits the received audio data to the client device 2 through a communication network 112 (either a wireless network or a wired network). The client device 2 processes the received audio data and outputs the processed audio data for the playback through a communication network 211. The other operations such as an initiating and a releasing of the pause process are also similarly executed. The detailed processes of the system will be explained later.

In this disclosure, it is also possible to initiate the processes from the server 1 by operating a switch 15 without receiving instructions from the remote controller 4.

Synchronization of Release of a Pause

Figure 2:
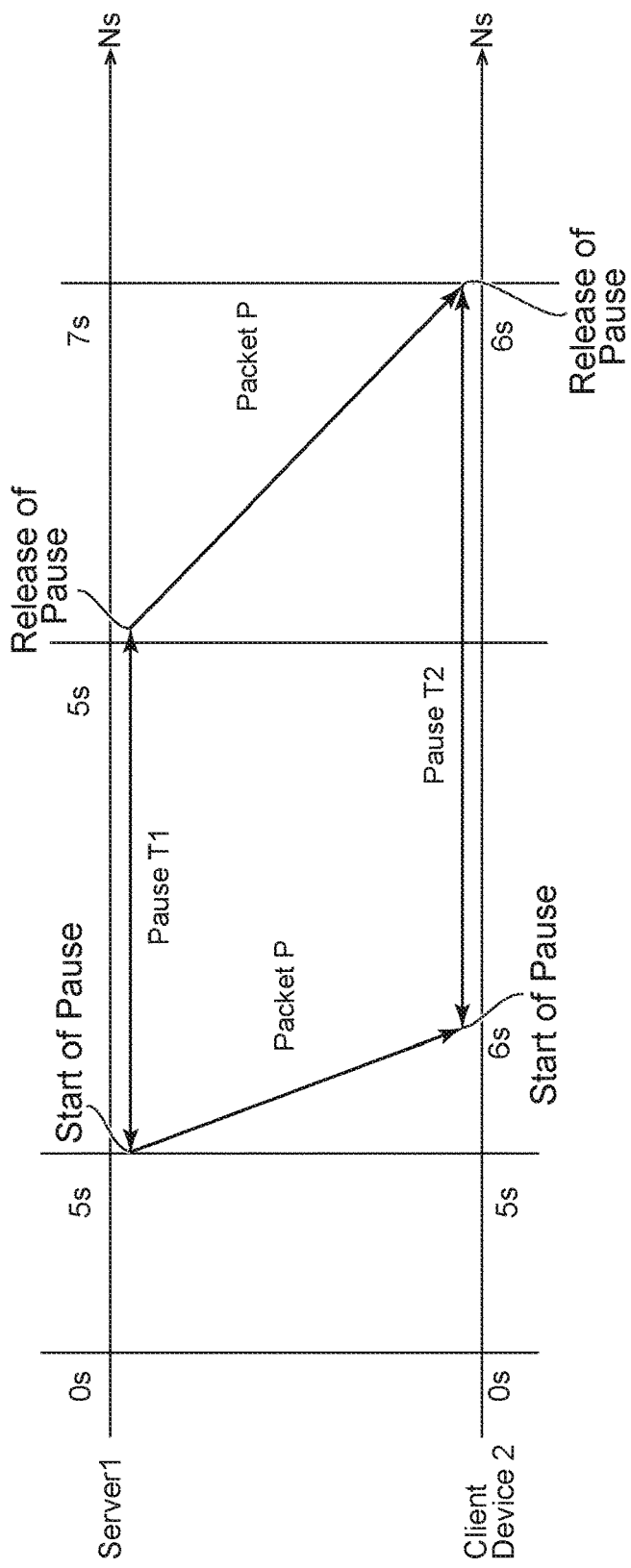
FIG. 2 shows related art.

The server sometimes synchronizes a pause process by delivering a packet (i.e., a control packet) that includes a pause instruction or a pause release instruction. However, when the server delivers the packet that includes the pause instruction or the pause release instruction to the client device, a problem occurs when a network delay (i.e., a packet delay between the server and the client device) at the time of the initiation of the pause process and a network delay at the time of the release of the pause process, are different. FIG. 2 shows related art which illustrates this problem. In FIG. 2, Ns (0 s, 5 s, 6 s, 7 s) shows the positions of the audio data (e.g., a music) which is being played. The server 1 starts the pause at 5 s and the client device 2 starts the pause at 6 s which is later than 5 s due to the network delay of delivering a packet P which includes the instruction to pause. Further, the audio data is already delivered to the client device 2 and is saved in the buffer for the playback before the receipt of the packet P. Thus, the audio data is played back until 6 s at the client device 2. The server 1 and the client device 2 synchronize the play back until the start of the pause process at 5 s. The server 1 pauses for the period of TL, and the client device 2 pauses for the period of T2 until it receives the packet P which includes the instruction to release the pause from the server 1. Then, if T1 is equal to T2, the synchronization continues between the server 1 and the client device 2 after the client device 2 resumes the playback. However, if T1 is not equal to T2, a non-synchronization occurs at a time of the resumption of the playback (i.e., a release of the pause) by the client device 2, and the non-synchronization continues thereafter.

This delay is a delay which occurs when the audio date is transmitted through the communication network, and is caused by a latency related to the transmission through the communication network, or a re-distribution of the packet due to a packet loss.

In view of the above problem, the present disclosure provides measures to synchronize the playback of the audio data between the server and the client device even if the packet delivery time is different between when the pause starting instruction is delivered and when the pause release instruction is delivered.

Figure 3:
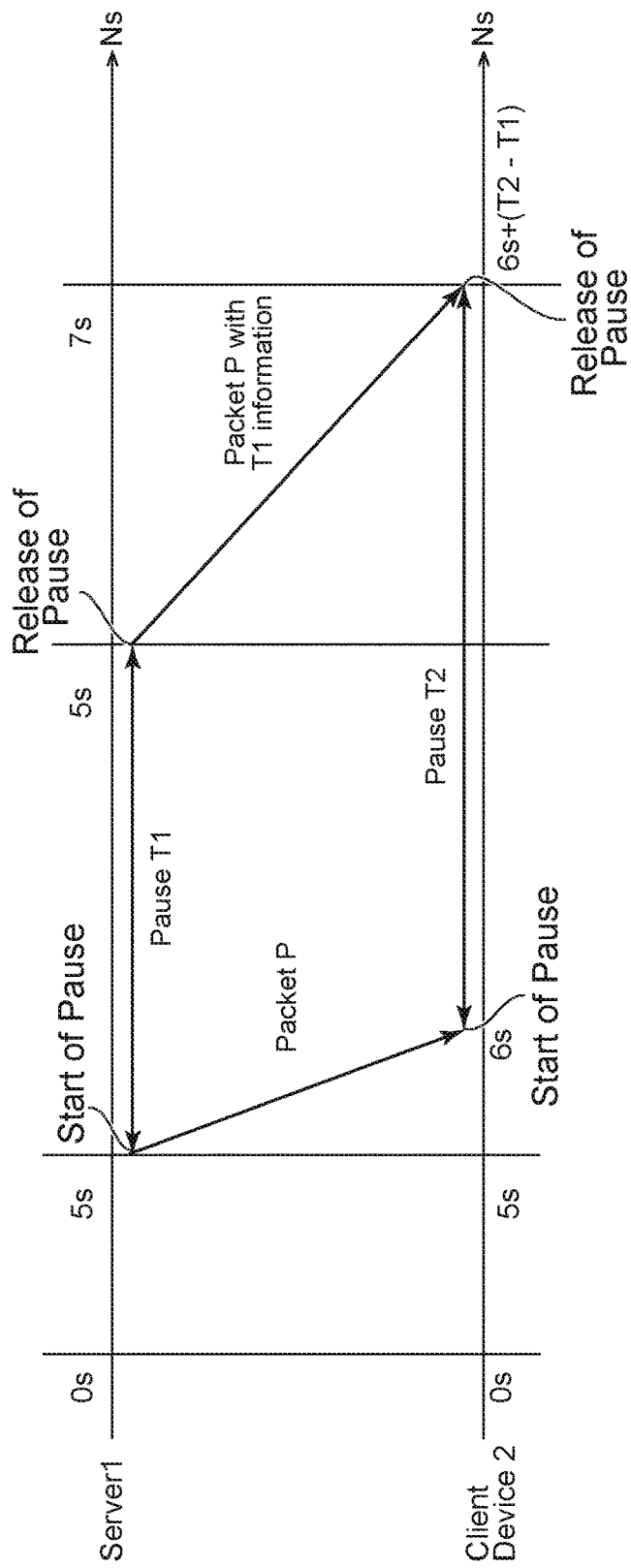
FIG. 3 shows an outline of the synchronization procedure.

A synchronization of a pause process in this disclosure is explained using FIG. 3. FIG. 3 shows an outline of the synchronization procedure. In FIG. 3, Ns (0 s, 5 s, 6 s, 7 s) shows the positions of the audio data (e.g., a music) which is being played back. For example, 5 s means that the position of the audio data is 5 seconds after the start of the playback. The server 1 starts the pause at 5 s and sends the control packet P which includes the instruction to start the pause process to the client device 2. The network delay at the time when the packet P is delivered from the server 1 to the client device 2 is assumed to be one second (1 second). Because there is a network delay (i.e., one second) and the audio data 6 s is already stored in the buffer 23, the client device 2 starts the pause at 6 s. Thus, the server 1 and the client device 2 are synchronized up until the 5 s mark. In addition, the client device 2 only continues the playback from S5 to S6, and thus there is not an occurrence of non-synchronization during this period. The server 1 pauses for the period of T1, while the client device 2 pauses for the period of T2. Then, to synchronize between the server 1 and the client device 2, at the time of the release of the pause (i.e., a resumption of a playback of the audio data), the following steps are the taken.

First, the server 1 calculates the period for which the server 1 paused (i.e., from the time the server 1 started the pause to the time when the server releases the pause). Then, the server 2 includes the period of time for which the server 1 paused in the packet P. The period for which the server 1 paused is the period from the time when the server 1 starts pausing and to the time when the server 1 resumes playback of the audio data (i.e., the time when the server releases the pause). In this embodiment, the server 1 paused for the period of T1, thus the server 1 includes the time T1 and the pause release instruction, in the control packet P, and delivers the packet P to the client device 2 through the network 112. The control unit 11 performs the above functions of the server 1 by executing the program stored in the memory 12.

Second, when the client device 2 receives the control packet P which includes the pause release instruction and the period T1 for which the server 1 paused, the client device 2 calculates a period T2 for which the client device 2 pauses (i.e., from the time the client device 2 started pausing to the time when the client device 2 releases the pause). If there is any response time by the client device 2 between the receipt of the instruction of the pause release to the initiation of the release of the pause (in other words, the processing time of the control unit 21), the client device 2 may add this response period to the time when the client device 2 receives the pause release instruction. For example, the client device 2 may calculate the response period based on the experience (e.g., a response period from the time the client device 2 received the pause instruction to the time when the client device 2 started pausing).

Then, the client device 2 compares the pause period T1 of the server 1 and the pause period T2 of the client device 2. Then, based on the results of the comparison between T1 and T2, the client server 2 adjusts the resumption of the playback as follows. In the following examples, the audio data is one which is already saved in the buffer 23 for playback.

(i) When T1>T2

When the server 1 is paused longer than the client device 2, the client device 2 waits until the start of playing the audio data for the period of T1-T2. That is, the client device 2 continues to pause for the period of T1-T2. Alternatively, the client device 2 may deliver silent audio data for the period of T1-T2. Here, silent audio data means that no sound is generated when it is played. The silent data may be initially saved in the memory 22 and is output when necessary. Thus, the server 1 and the client device 2 can synchronize the playback of the audio data at the time when the client device resumes the playback. For example, when T1-T2 is one second (1 second), the client device 2 waits until the start of the playback for one second. Then, during this period (i.e., one second), the playback position of the audio data by the server 1 becomes 5 s to 6 s. Thus, the server 1 and the client device 2 can synchronize the playback of the audio data at the time when the client device resumes the playback of the audio data at 6 s.

(ii) When T2>T1

Figure 4:
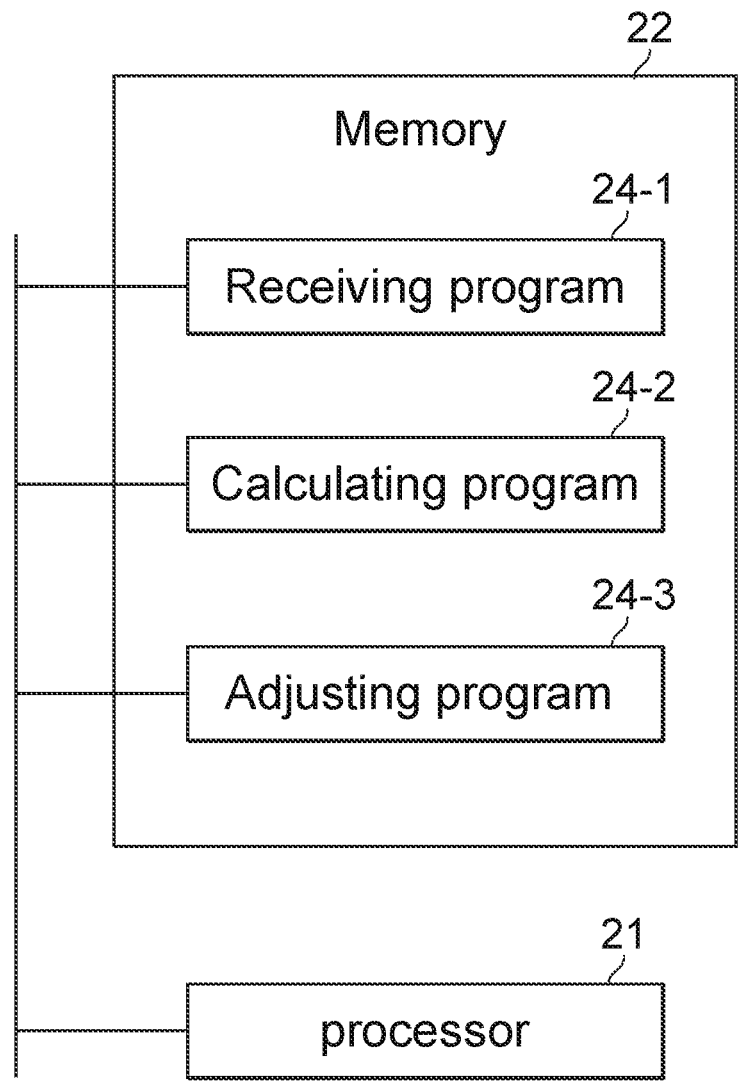
FIG. 4 shows one example of a memory that stores programs.

When the client device 2 is paused longer than the server 1, the client device 2 starts playback of the audio data after cutting the audio data which corresponds to T2-T1. For example, when T2-T1 is one second (1 second), the client device 2 adjusts the audio data by cutting a first part of the audio data which corresponds to one second, and resumes the playback of the music, where the first one second portion is cut. In FIG. 4, the client device 2 starts the resumption of the playback from 7 s instead of 6 s. Before the client device 2 starts the playback, the server 1 plays for two seconds and thus the position of the audio data in the server 1 changes from 5 s to 7 s. Two seconds is a sum of i) the network delay when the pause initiation instruction is sent (1 second), and ii) T2-T1 (1 second). Thus, the server 1 and the client device 2 can synchronize the playback of the audio data at time 7 s when the client device 2 resumes the playback.

(iii) When T1=T2

This is a situation where the server 1 and the client device 2 pause for the same period. In this case, the network delay at the time the pause instruction is sent and the network delay at the time the pause release instruction is sent are the same. Thus, the server 1 plays for one second (i.e., the network delay) before the client device 2 resumes the playback, and thus the playback position of the audio data in the server 1 changes from 5 s to 6 s when the client device 2 resumes the playback at 6 s. Thus, the server 1 and the client device 2 can synchronize the playback of the audio data at the time when the client device 2 resumes the playback of the audio data at 6 s. The client device 2 immediately resumes the playback of the audio data upon receipt of the pause release instruction.

The control unit 21 performs the above functions of the client device 2 by executing the program stored in the memory 22. FIG. 4 shows one example of the present disclosure, where the memory 22 includes a receiving program 24-1, a calculating program 24-2, and an adjusting program 24-3, and the processor 21 which works as the control unit executes these programs 24-1, 24-2 and 24-3 to perform the above functions.

Thus, as discussed above and illustrated in FIG. 3, in the above (i), (ii) and (iii) situations, the server 1 and the client device 2 can synchronize the playback of the audio data at the time when the client device 2 resumes the playback, and the synchronization continues thereafter.

Accordingly, even if there is a situation where the network delay (in other words, the packet delay between the server 1 and the client device 2) at the time of the initiation of the pause process and the network delay at the time of the release of the pause process are different, the server 1 and the client device 2 can synchronize the playback after the release of the pause.

Further, the client device 2 checks the whether there is any difference between the pause periods of the server 1 and the client device 2, and adjusts the resumption of the playback to synchronize, if there is any difference. Thus, it is possible for the client device 2 to synchronize with the server 1, based on the client device 2's situation. In addition, this is achieved even in the situation where there are a plurality of the client devices 2, because each client device 2 can adjust the resumption of the playback to synchronize in view of its own situation. In addition, the server 1 is only required to deliver its pause period, and does not need to adjust its operation or take any specific measures for achieving the synchronization. Thus, it is possible to solve the problems in delivering the audio data through the network.

Figure 5:
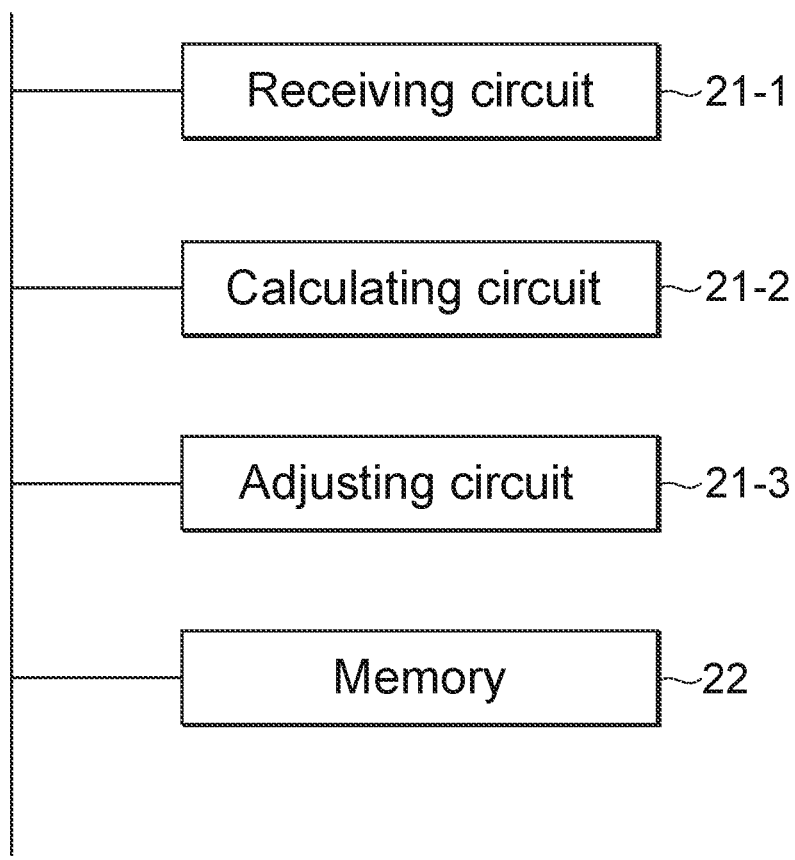
FIG. 5 shows one example of a control unit.

Further, as shown in FIG. 5, a receiving circuit 21-1, a calculating circuit 21-2 and an adjusting circuit 21-3 may perform the above functions of the control unit 21.

Other Measures

Instead of cutting the audio data and waiting for the start of the playback of the audio data, there are other measures which can be taken to achieve the synchronization as discussed below.

For example, the client device 2 may save audio data, which has been played before, in the memory 22. Then, when T1>T2, the client device 2 delivers the saved audio data for the period of T1-T2 instead of waiting for the start of the playback of the audio data for the period of T1-T2. In this approach, the timing of the release of the pause at the client device 2 becomes close to the timing of the release of the pause at the server 1 because the client device 2 starts the playback without waiting for the period of T1-T2.

Further, the server 1 may start the resumption of the playback with a delay instead of starting the resumption immediately upon receipt of the pause release instruction. For example, the server 1 may add a time (t), which is required for delivering the data to the client device 2, to T1; and send the time (T1+t) to the client device 2. Then, the server 1 starts the resumption of the playback after the client device 1 receives the packet including the modified pause period (T1+t).

Further, the client device 2 can adjust an audio clock and modify the speed of the playback (e.g., increasing a speed of the audio data), thereby gradually achieving the synchronization. For example, when T2>T1, the client device 2 may increase the speed of the playback for a predetermined period, thereby achieving the synchronization at the end of the predetermined period. On the other hand, when T1>T2, the client device 2 may slow down the speed of the playback for the predetermined period, thereby achieving the synchronization at the end of the predetermined period.

These measures also have the save advantages as discussed above.

Packet

Next, the packet P, which is delivered from the server 1 to the client device 2, will be explained by using FIG. 6. FIG. 6 shows an example of the format of the packet P, which is relevant to this disclosure. The packet P includes the following: (i) Play Timestamp (Ts) which indicates a time of the playback; (ii) Time Offset (To) which indicates the pause period (T1) for which the server 1 is paused (this is zero (0) at the start of the playback, and then a time is added each time the server 1 pauses); (iii) Pause Flag (Fp) which indicates whether the server 1 is paused or not (when the server 1 is paused, this is ON, and when the server 1 is not paused, this is OFF); (iv) Gain Offset (Og) which is used to adjust the differences of the sound intensities of the audio data delivered to the server 1 from the different sources (the details of Gain Offset will be explained later); and (v) Audio Data (Da) which is a place where the audio data is saved, where the audio data is received from the audio data server 3.

The packet P can also include additional structures such as information which shows the type of the packet and information which shows the packet number, for example. Further, FIG. 6 shows one example of the packet P structure, and any type may be used as long as it achieves the objects of the present invention.

A Flow of the Overall System

Figure 7:
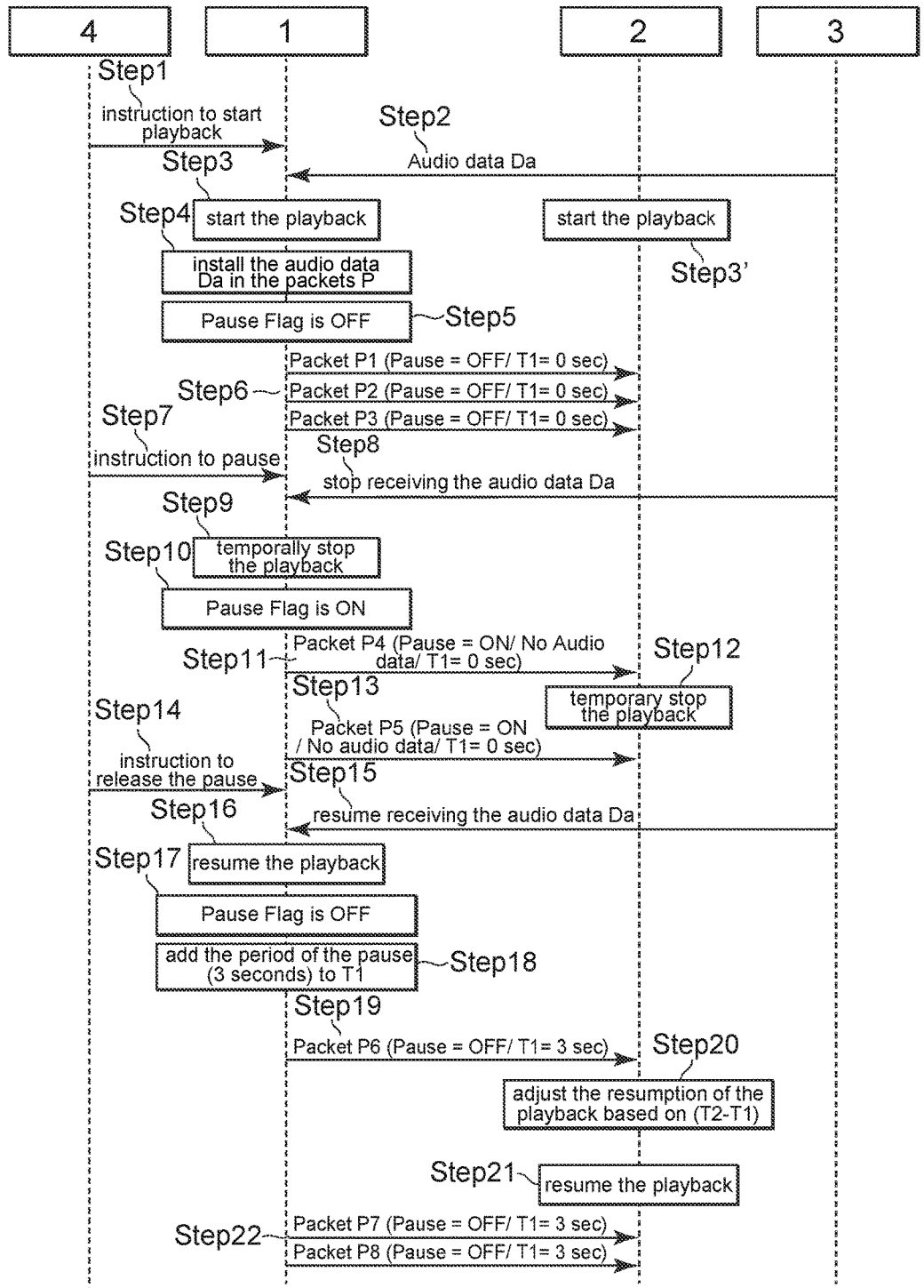
FIG. 7 shows one example of a flow of the overall system.

As one example, FIG. 7 shows a flow of the overall system. The system proceeds as follows:

At step 1, a user, using the remote controller 4, instructs the server 1 to start the playback. The remote controller 4 wirelessly transmits the instruction of starting the playback to the server 1.

At step 2, in view of the instruction to start the playback, the server 1 requests and receives audio data Da from the audio data server 3.

At step 3 and step 3', in response to the instruction to start the playback, each of the server 1 and the client device 2 starts the playback of the audio data which is saved in the respective buffer 14 and 23.

At step 4, the server 1 installs the audio data Da in the packets P.

At step 5, because the server 1 has not received the pause instruction, the server 1 sets the Pause Flag (Fp) to OFF.

At step 6, the server 1 sends the packets P1, P2, P3 to the client device 2, where the Pause Flag (Fp) is OFF and the pause period (T1) at Time Offset (To) is 0.

At step 7, the user, using the remote controller 4, instructs the server 1 to pause. The remote controller 4, wirelessly transmits the instruction of starting the pause process, to the server 1.

At step 8, in view of the instruction to pause, the server 1 stops receiving the audio data Da from the audio data server 3.

At step 9, in response to the pause instruction, the server 1 temporarily stops the playback.

At step 10, because the pause instruction is issued, the server 1 sets the Pause Flag (Fp) to ON.

At step 11, the server 1 sends the packet P4 to the client device 2, where (i) the pause period (T1) at Time Offset (To) is 0, (ii) the Pause Flag (Fp) is ON and (iii) the audio data Da is not included. Thus, the pause instruction is sent to the client device 2.

At step 12, because the client device 2 received the pause instruction at step 11, the client device 2 temporarily stops the playback.

At step 13, the server 1 sends the packet P5 to the client device 2, where the Pause Flag (Fp) is ON and the pause period T1, at Time Offset (To), is 0.

At step 14, the user, using the remote controller 4, instructs the server 1 to release the pause. Here, it is assumed that the server 1 paused for three seconds (3 seconds).

At step 15, in view of the pause release instruction, the server 1 resumes receiving the audio data Da from the audio data server 3.

At step 16, the server 1 resumes the playback.

At step 17, in accordance with the pause release instruction, the server 1 sets the Pause Flag (Fp) to OFF.

At step 18, the server 1 adds the period of the pause (3 seconds) to the pause period T1 (0) at the Time Offset (Tp).

At step 19, the server 1 sends the packet P6 to the client device 2, where the Pause Flag (Fp) is OFF and the pause period T1 is 3 seconds. Thus, the server 1 informs the client device 2 that the pause release instruction is issued and the server 1 is paused for 3 seconds.

At step 20, the client device 2 compares the period (T1=3 seconds) for which the server 1 was paused and the period (T2) for which the client device 2 was paused. Then, as discussed above, based on the results of the comparison between T1 and T2, the client server 2 adjusts the resumption of the playback to synchronize between the server 1 and the client device 2.

At step 21, the client device 2 resumes the playback based on the results of step 20.

At step 22, the server 1 sends the packets P7 and P8 to the client device 2, where the Pause Flag (Fp) is OFF, and the pause period T1 is 3 seconds.

When the server 1 sends the packets P1, P2, P3, P6, P7, P8 at the steps 6, 19 and 22, each packet contains the audio data Da. On the other hand, at steps 11 and 13, the packets P4 and P5 do not include the audio data Da. Further, after receipt of the audio data Da, the client device 2 adjusts a sound intensity of the audio data Da based on the Gain Offset (Og), which will be described later.

The above functions of the server 1 and the client device 2 are performed by the respective control units 11 and 21, by executing the respective programs stored in the respective memory 12 and 22. In addition, the control unit 41 of the remote controller 4 (e.g., a mobile phone) performs the above functions of the remote controller 4 by executing the application stored in the memory 41.

FIG. 7 shows one example of the flow of the system. Other implementations may be used as long as they are consistent with the principle of this invention. For example, the server 1 may include a switch 15 so that the user can give instructions such as the initiation of the playback, the initiation of the pause, and the release of the pause by using the switch 15.

Other Advantage

In addition to the above advantages of synchronizing the pause process, the present application provides the following advantageous results (i.e., preventing an overflow of a buffer in the client device).

Figure 8:
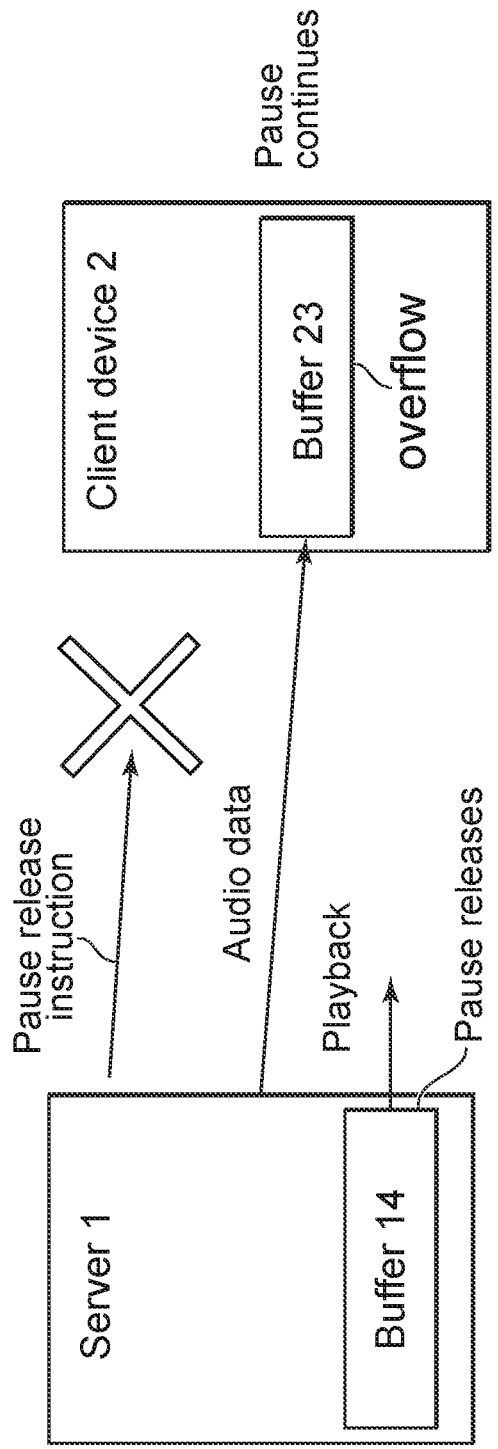
FIG. 8 shows related art.

When the pause release is activated, the server 1 starts the playback of the audio data stored in the buffer 14 and delivers the pause release instruction to the client device 2. However, if the pause release instruction does not reach the client device 2, a problem occurs at the client device 2 such that the buffer 23 of the client device 2 overflows because the audio data continues to be delivered from the server 1, while the client device 2 remains paused (i.e., not to restart the playback), as illustrated in FIG. 8. However, the present disclosure can avoid this problem.

As discussed above, the pause release instruction is contained in the packet P and is sent to the client device 2 together with the audio data Da. Thus, when the audio data Da reaches the client device 2, the pause release instruction simultaneously reaches the client device 2. Thus, the client device 2 resumes the playback and this can avoid the overflow of the buffer 23 of the client device 2. Accordingly, it is possible to solve the problems in delivering the audio data through the network. Further, the server 1 can take the above measure to solve the problem and the client device 2 is not required to take any measure(s). Thus, the above measure can be taken by the server 1 alone even if there are a plurality of client devices 2.

Other Features

Figure 9:
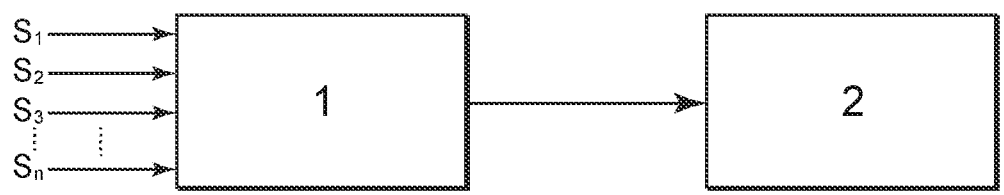
FIG. 9 shows an example of the server which receives audio data from a plurality of audio sources.

As discussed above, the packet P includes Gain Offset (Og). Gain Offset (Og) is used to adjust the differences of the sound intensities of the audio data from different sources. As shown in FIG. 9, the server 1 receives audio data from a plurality of audio sources S1, S2, S3 . . . Sn (e.g., High-Definition Multimedia Interface (HDMID, Analog, Universal Serial Bus (USB), Net Radio, etc.). However, each of the plurality of audio sources has a respective sound intensity (in other words, acoustic intensity). For example, analog audio data is delivered to the server 1 with the sound intensity of 3 dB, while the audio data from a USB enters the server 1 with the sound intensity of 10 dB. Thus, the server 1 receives different sound intensities (i.e., 3 dB and 10 dB) of audio data from the respective audio sources (i.e., Analog and USB). If the server 1 delivers the received audio data to the client device 2, the sound intensities are not consistent. Thus, it is required to adjust the sound intensities of the audio data from the different sources S1, S2, S3 . . . Sn. This can be done by adding sound intensity to the audio data of each audio source. The Gain Offset indicates this additional sound intensity. For example, Gain Offset of the analog audio data may be set to +6 dB, which means adding 6 dB to the original 3 dB, and Gain Offset of the audio data from USB may be set to +0, which means adding 0 dB to the original 10 dB. Thus, when the analog audio data and the audio data from USB will be played back, it will be at a similar sound intensity (i.e., 9 dB and 10 dB, respectively). Thus, it is possible to adjust the differences of the sound intensities from different sources.

In this disclosure, a Gain Offset is contained in the packet P, and thus a Gain Offset is sent to the client device 2 together with the audio data. This ensures that when the audio data arrives at the client device, a Gain Offset also arrives at the client device 2. Thus, it is possible to avoid the problems which occur when a Gain Offset and the audio data are delivered separately. Such problems include a situation where the audio date is delivered to the client device 2, but the Gain Offset is not delivered, or the Gain Offset is delivered earlier or later than the audio data. For example, if the delay of a Gain Offset or a non-delivery of a Gain Offset occurs at a time when the analog audio data (Gain Offset: +6 dB) is switched to the audio data of a USB (Gain Offset: +0 dB), the audio data of a USB is played with a Gain Offset of +6 dB and thus the audio data is played back with an unexpected sound intensity of 16 dB (10+6 dB). Thus, by adding a Gain Offset to the packet which contains the audio data, a Gain Offset reaches the client device 2 at the same time when the audio data reaches the client device 2. Therefore, the client device 2 can adjust the sound intensities properly. Thus, it is possible to avoid the situation when the audio data and a Gain Offset do not match, which causes the above problems.

Further, the server 1 may deliver the audio data to the client device 2 after adjusting an amplitude of a digital signal of the audio data. However, when the server 1 and the client device 2 have different equipment and/or models, there is a possibility of different auditability between the playback from the server 1 and the playback from the client device 2. For example, when the amplitude of the digital signal is halved and is sent, and if a process by a Digital Signal Processor (DSP) at the client device 2 is different from that of the server 1, an output from a speaker of the client device 2 may not be the same as that from the server 1 because the relationship between the original amplitude and the output from the speaker of the client device 2 may not be linear.

In addition, giving the client device 2 the instruction to adjust an output by a certain amount (e.g., +3 dB) ensures a reliable adjustment of the differences of the models and data processing between the server 1 and the client device 2.

Thus, in the process shown in FIG. 7, when the client device 2 receives the packet, the client device 2 adjusts the intensity of the output of the audio data Da based on a Gain Offset (Og) included in the packet P, and then the client device 2 plays back the audio data with the adjusted sound intensity. This process is also performed by the control unit 21 by executing the program stored in the memory 22.

In the above embodiment, the server and the client device may be used for many technical fields. For example, the server 1 and the client device 2 can be connected to a stereo of a right output and a left output, respectively. Further, it is possible that each of the server 1 and the client device 2 is placed in a respective room and the audiences listen to the audio data in the respective room in a synchronized manner. The audio data may be music. However, it is not limited to music and other types of the audio data can be used for this application. In addition, it is not necessary that only the audio data is distributed from the server 1 to the client device 2, and the principle of the present disclosure is applied for the audio data which is distributed with the image data and other data to the client device 2.

While specific embodiments of the invention have been shown and described in detail to illustrate the application of the principles of the invention, it is understood that the invention may be embodied otherwise without departing from such principles. It is further understood that the invention is not limited to the specific embodiments described herein, but is defined by the appended claims.

I claim:

1. A method for synchronizing a pause process during playback of audio data, comprising:
    delivering i) a pause release instruction, and ii) a first period for which a first audio device is paused, the pause release instruction and the first period for which the first audio device is paused being delivered simultaneously, the steps being performed by a first processor of the first audio device; and
    (i) receiving i) the pause release instruction, and ii) the first period for which the first audio device is paused, simultaneously, and (ii) adjusting the playback of the audio data based on a difference between the first period and a second period for which a second audio device is paused, the steps being performed by a second processor of the second audio device which is different from the first audio device.

2. The method according to claim 1, wherein
    when the second period is longer than the first period, adjusting the playback of the audio data by cutting the audio data for a period corresponding to the difference between the first period and the second period, the step being performed by the second processor of the second audio device.

3. The method according to claim 2, wherein
when the first period is longer than the second period, (i) delaying a start of the playback of the audio data for the period corresponding to the difference between the first period and the second period, or (ii) playing silent audio data for the period corresponding to the difference between the first period and the second period before the start of the playback of the audio data, the step being performed by the second processor of the second audio device.

4. The method according to claim 2, wherein
when the first period is longer than the second period, playing another audio data for the period corresponding to the difference between the first period and the second period before the playback of the audio data, the other audio data being played before and is different from the audio data, the step being performed by the second processor of the second audio device.

5. The method according to claim 1, further comprising:
calculating the difference between the first period for which the first audio device is paused and the second period for which the second audio device is paused, the step being performed by the second processor of the second audio device.

6. The method according to claim 1, wherein
the pause release instruction and the first period are installed in a packet, the packet including the pause release instruction and the first period is delivered by the first processor of the first audio device, and
the packet including the pause release instruction and the first period is received by the second processor of the second audio device.

7. A system for synchronizing a pause process during playback of audio data, comprising:
a first audio device that includes:
 a first memory that stores first instructions, and
 a first processor that is configured to execute the first instructions stored in the first memory to: deliver i) a pause release instruction, and ii) a first period for which the first audio device is paused, the pause release instruction and the first period for which the first audio device is paused being delivered simultaneously; and
a second audio device which is different from the first audio device and includes:
 a second memory that stores second instructions, and
 a second processor that is configured to execute the second instructions stored in the second memory to:
  receive i) the pause release instruction, and ii) the first period for which the first audio device is paused, and
  adjust the playback of the audio data based on a difference between the first period and a second period for which the second audio device is paused.

8. The system according to claim 7, wherein
when the second period is longer than the first period, the second processor adjusts the playback of the audio data by cutting the audio data for a period corresponding to the difference between the first period and the second period.

9. The system according to claim 8, wherein
when the first period is longer than the second period, the second processor (i) delays a start of the playback of the audio data for the period corresponding to the difference between the first period and the second period, or (ii) plays silent audio data for the period corresponding to the difference between the first period and the second period before the start of the playback of the audio data.

10. The system according to claim 8, wherein
when the first period is longer than the second period, the second processor device plays another audio data for the period corresponding to the difference between the first period and the second period before the playback of the audio data, the other audio data being played before and is different from the audio data.

11. The system according to claim 7, further comprising:
a third device that includes:
 a third memory that stores third instructions, and
 a third processor that is configured to execute the third instructions to transmit the pause release instruction to the first audio device,
wherein the third device is different from the first audio device and the second audio device.

12. The system according to claim 7, wherein
the first processor delivers (i) the audio data and (ii) instruction to adjust a sound intensity of the audio data, the audio data and the instruction to adjust the sound intensity of the audio data being delivered simultaneously,
the second processor receives (i) the audio data and (ii) the instruction to adjust the sound intensity of the audio data, simultaneously, and
the second processor adjusts the sound intensity of the audio data, and performs the playback of the adjusted audio data.

13. The system according to claim 12, wherein
the first processor receives the audio data from a plurality of audio sources, each of the plurality of audio sources delivering the audio data with a different sound intensity.

14. A method for releasing a pause process during playback of audio data, comprising:
receiving i) a pause release instruction, ii) first audio data and iii) instruction to adjust a sound intensity of the first audio data, the pause release instruction, the first audio data and the instruction to adjust the sound intensity of the first audio data being received simultaneously, the step being performed by a first processor of a first audio device;
releasing the pause process in response to the receipt of the pause release instruction, the step being performed by the first processor of the first audio device, and
adjusting the sound intensity of the first audio data in response to the instruction to adjust the sound intensity, playback of the first audio data being performed after the sound intensity is adjusted, the step being performed by the first processor of the first audio device.

15. The method according to claim 14, further comprising:
resuming playback of second audio data in response to the pause release instruction, the second audio data being stored in a memory and is different from the first audio data, the first audio device comprising the memory, the step being performed by the first processor of the first audio device.

16. The method according to claim 14, further comprising:
delivering i) the pause release instruction and ii) the first audio data simultaneously to the first audio device, the step being performed by a second processor of a second audio device which is different from the first audio device.

17. The method according to claim 16, further comprising:
    transmitting the pause release instruction to the second audio device, the step being performed by a third processor of a third device which is different from the first audio dice and the second audio device.

18. The method according to claim 14, further comprising:
    delivering (i) the first audio data and (ii) the instruction to adjust the sound intensity of the first audio data, the first audio data and the instruction being delivered simultaneously, the step being performed by a second processor of a second audio device which is different from the first audio device.

* * * * *